Patented June 13, 1944

2,351,069

UNITED STATES PATENT OFFICE 2,351,069

PROCESS OF MAKING HETEROCYCLIC NITROGEN-CONTAINING COMPOUNDS

William L. Ruigh, Princeton, N. J., assignor to Merck & Co., Inc., Rahway, N. J., a corporation of New Jersey No Drawing. Application December 7, 1940, Serial No. 369,139

6 Claims. (Cl. 260—289)

This invention relates to heterocyclic nitrogen-containing compounds, and to a process of making the same.

I have discovered that 1-(alpha tetrahydroquinolinyl)-methylalkylketones are valuable taeniacides. Such ketones may be prepared by reacting a lithium derivative of quinaldine with an anhydride of an aliphatic acid, and hydrogenating the reaction product.

The new compounds of the present invention have the formula 1-(alpha quinolinyl)$CH_2COR$, 1-(alpha tetrahydroquinolinyl)$CH_2COR$, and salts thereof, wherein R is a lower alkyl radical.

The following example illustrates a method of carrying out the invention, but it is to be understood that this example is given by way of illustration, and not of limitation.

Example

Five hundred cc. of dry ether are placed in a flask, the air of which has been replaced with dry nitrogen, 91.5 gm. of freshly cut lithium shavings and about 50 cc. of dry bromobenzene are added, and the mixture stirred. A slow stream of nitrogen is passed into the flask during the course of the reaction. After the reaction has started, 2.5 liters of dry ether are added, followed by the addition of the remainder of a total of 1,036 gm. of bromobenzene. During the addition of the bromobenzene, it is necessary to intermittently cool the flask with ice water. After all of the bromobenzene has been added, the reaction mixture is stirred for about 20 minutes. After the lithium has reacted, 858 gm. of quinaldine are added over a period of about 20 minutes. The solution is stirred for an additional 30 minutes followed by the slow addition of 612 gm. of acetic anhydride with cooling. After all of the acetic anhydride has been added, the reaction mixture is stirred for 15 minutes. Ice is added to the mixture, and any remaining lithium particles are removed. The mixture is then made acid to Congo red, and the aqueous solution is extracted with two 500 cc. portions of benzene. The aqueous solution is then made strongly alkaline with solid potassium hydroxide, and extracted with five 1 liter portions of benzene. The benzene extracts are allowed to stand overnight, filtered, and dried with 15 gm. of potassium carbonate. The mixture is filtered, 300 gm. of solid potassium hydroxide are added, and the mixture is stirred for 3 hours on a steam bath. The mixture is filtered, the precipitate washed with anhydrous ether and then the solid product is stirred with ice water. (When 1-(alpha quinolinyl)-propanone-2 is stirred in benzene solution with solid potassium hydroxide, a solid potassium salt is formed. This salt is unstable in the presence of water, and is decomposed by the ice water treatment.) The aqueous suspension is filtered, the solid washed with ice water, and air dried. It may be purified by recrystallization, or by distillation, B. P. 143–4° C. at 2 mm. pressure. Yield—209 gm.

The hydrochloride of the base is formed by dissolving 1 gm. of the ketone in 100 cc. of absolute alcohol, and passing in dry hydrochloric acid gas. The mixture is then evaporated in vacuo to dryness, and recrystallized from alcohol-ether, M. P. 154–6° C. On recrystallization from alcohol-ether, it melts at 156°–157° C.

Other salts, such as the sulfate, tannate, etc., may be obtained by treating the above hydrochloride with the acid corresponding to the salt desired.

18.5 gm. of 1-(alpha quinolinyl)-propanone-2 and 15 cc. of concentrated hydrochloric acid are dissolved in 250 cc. of absolute alcohol, and 0.5 gm. of platinum oxide catalyst added. Twenty cc. of water are added, and the mixture is hydrogenated during the course of 5½ hours with further addition of 1.5 gm. of platinum catalyst. The mixture is filtered, and evaporated to dryness. The 1-(alpha tetrahydroquinolinyl)-propanone-2 is recrystallized from alcohol, M. P. 225° C. with decomposition.

Higher ketones may be obtained by employing anhydrides other than acetic anhydride. For example, when employing propionic anhydride or butyric anhydride in the above process, 1-(alpha tetrahydroquinolinyl)-butanone-2 or 1-(alpha tetrahydroquinolinyl)-pentanone-2 respectively are obtained.

Modifications may be made in carrying out the present invention without departing from the spirit and scope thereof and I am to be limited only by the appended claims.

I claim:

1. The process comprising reacting the lithium derivative of quinaldine with an anhydride of an aliphatic acid.

2. The process comprising reacting the lithium derivative of quinaldine with an anhydride of an aliphatic acid, and hydrogenating the reaction product.

3. The process comprising reacting lithium with bromobenzene, treating the reaction product with quinaldine, and treating the latter reaction product with acetic anhydride.

4. The process comprising reacting lithium with bromobenzene, treating the reaction product with quinaldine, treating the latter reaction product with acetic anhydride, and hydrogenating the latter reaction product.

5. The process comprising reacting lithium with bromobenzene, treating the reaction product with quinaldine, treating the latter reaction product with propionic anhydride, and hydrogenating the latter reaction product.

6. The process comprising reacting lithium with bromobenzene, treating the reaction product with quinaldine, treating the latter reaction product with butyric anhydride, and hydrogenating the latter reaction product.

WM. L. RUIGH.